United States Patent
Chang et al.

(10) Patent No.: US 10,977,492 B2
(45) Date of Patent: Apr. 13, 2021

(54) METHOD AND APPARATUS FOR PRELOAD DISPLAY OF OBJECT INFORMATION

(71) Applicants: Industrial Technology Research Institute, Hsinchu (TW); Intellectual Property Innovation Corporation, Hsinchu (TW)

(72) Inventors: Chih-Chia Chang, Hsinchu County (TW); Yu-Hsin Lin, Miaoli County (TW); Jian-Lung Chen, Taoyuan (TW); Pi-Hsien Wang, Hsinchu (TW)

(73) Assignees: Industrial Technology Research Institute, Hsinchu (TW); Intellectual Property Innovation Corporation, Hsinchu (TW)

( * ) Notice: Subject to any disclaimer, the term of this patent is extended or adjusted under 35 U.S.C. 154(b) by 205 days.

(21) Appl. No.: 16/231,943

(22) Filed: Dec. 25, 2018

(65) Prior Publication Data
US 2020/0089955 A1    Mar. 19, 2020

(30) Foreign Application Priority Data
Sep. 14, 2018   (TW) .................................. 107132541

(51) Int. Cl.
*G06K 9/00* (2006.01)
*G06T 7/246* (2017.01)

(52) U.S. Cl.
CPC .......... *G06K 9/00671* (2013.01); *G06T 7/246* (2017.01)

(58) Field of Classification Search
None
See application file for complete search history.

(56) References Cited

U.S. PATENT DOCUMENTS

| 8,466,894 | B2 | 6/2013 | Sugita et al. |
| 2012/0072873 | A1 | 3/2012 | Park et al. |
| 2013/0265232 | A1 | 10/2013 | Yun et al. |
| 2015/0002394 | A1* | 1/2015 | Cho .................. G02B 27/0093 345/156 |

(Continued)

FOREIGN PATENT DOCUMENTS

| CN | 102868897 | 1/2013 |
| CN | 104052923 | 9/2014 |

(Continued)

OTHER PUBLICATIONS

"Office Action of Taiwan Counterpart Application", dated Jan. 9, 2020, pp. 1-8.

*Primary Examiner* — Atiba O Fitzpatrick
(74) *Attorney, Agent, or Firm* — JCIPRNET

(57) ABSTRACT

A method and an apparatus for preload display of object information are provided. The method includes following steps: capturing an external object information on a side of the transparent display opposite to a user by using the first information capturing device; pre-identifying at least one object in the external object information and tracing the at least one object according to an identification result; capturing information of the user by using the second information capturing device for pre-identifying and tracing a pointing range of the user, and determining whether the traced objects appear within the pointing range; and preload displaying object information of the objects appearing within the pointing range on the transparent display.

16 Claims, 5 Drawing Sheets

(56) References Cited

U.S. PATENT DOCUMENTS

| | | | |
|---|---|---|---|
| 2016/0209916 A1 | 7/2016 | Sendai et al. |
| 2016/0314624 A1 | 10/2016 | Li et al. |
| 2016/0321843 A1 | 11/2016 | Kasahara et al. |

FOREIGN PATENT DOCUMENTS

| | | |
|---|---|---|
| CN | 104823152 | 8/2015 |
| CN | 105319716 | 2/2016 |
| TW | 200806035 | 1/2008 |
| TW | 201350912 | 12/2013 |
| TW | 201428594 | 7/2014 |

* cited by examiner

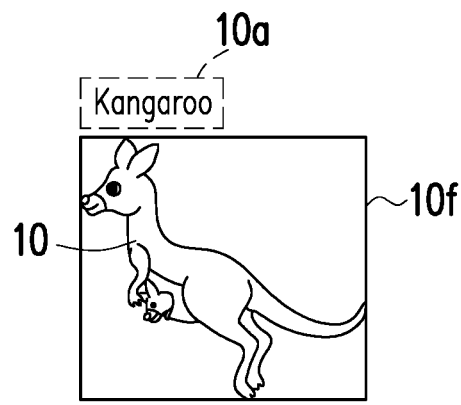 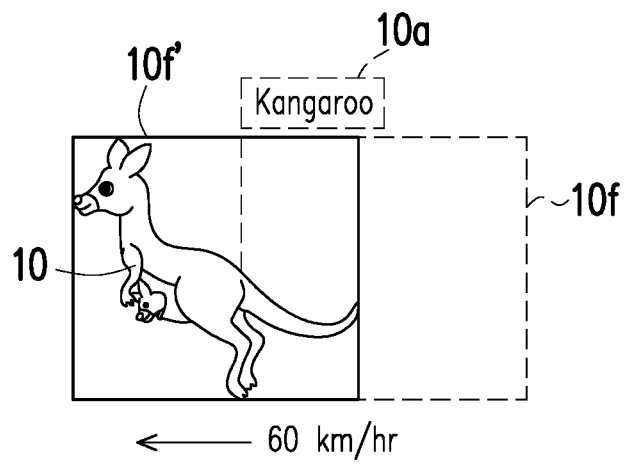
FIG. 1A    FIG. 1B
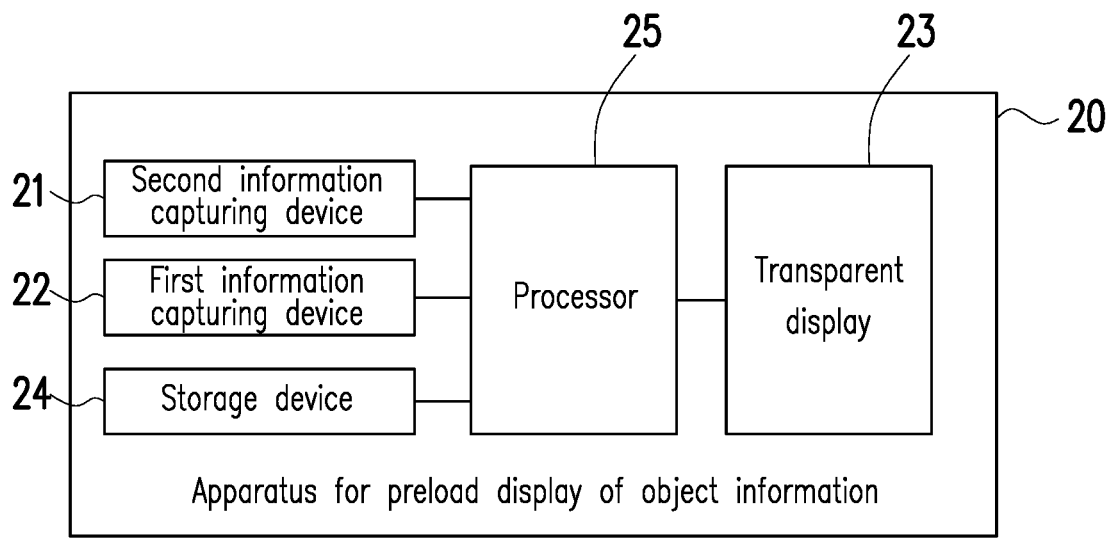
FIG. 2

METHOD AND APPARATUS FOR PRELOAD DISPLAY OF OBJECT INFORMATION

CROSS-REFERENCE TO RELATED APPLICATION

This application claims the priority benefits of Taiwan application serial no. 107132541, filed on Sep. 14, 2018. The entirety of the above-mentioned patent application is hereby incorporated by reference herein.

TECHNICAL FIELD

The disclosure relates to a method and an apparatus for display of information, and also relates to a method and an apparatus for preload display of object information.

BACKGROUND

Transparent displays may be categorized into transmission transparent displays and projection transparent displays according to their technical principles. The transmission transparent display is designed by manufacturing the display panel as transparent in a see-through manner, and the projection transparent display is designed by using the projection method to project an image onto a reflective and transparent substrate to achieve the transparent display effect.

The transparent display is transparent, lightweight, and combines the virtual images displayed on the display with the scenario in real world, providing viewers with an intuitive and instinctive interactive experience. The viewer not only can see the physical object through the transparent display, but also can see the information overlapping or displayed around the physical object on the transparent display, and even can interact with the display information on the transparent display through touch technologies.

Transparent displays have been widely used in applications such as vehicle head-up displays, vending machines, windows display, museum exhibits, and sightseeing vehicle tours. However, since it requires a large amount of calculation and calculation time for identifying the object, for an object that moves fast, if the object is identified while it is captured by human eye, the object may have left its original position when the identification is completed. In that case, the display position of the object information is different from the position of the object.

For example, FIG. 1A and FIG. 1B are schematic views illustrating display of object information. Referring to FIG. 1A, even when the object 10 in the image is in a stationary state, it takes a certain amount of time (for example, about 250 milliseconds) to identify the object 10, and since the object 10 does not move, the object information 10a (for example, "kangaroo" shown in the drawing) generated through the identification may be displayed at an appropriate position around an object frame 10f of the object. However, when the object 10 in the image is in a moving state (for example, moving to the left at a speed of 60 km/h), after the identification time elapses, the object 10 has moved forward by a certain distance (for example, the object frame 10f has been moved to the left by about half the width of the frame as compared to the object frame 10f that is originally displayed), which causes that the object information generated and displayed through the identification apparently falls behind the object 10 and results in a negative use experience for the user.

SUMMARY

An embodiment of the disclosure provides a method for preload display of object information. The method includes the following steps: capturing an external object information on a side of a transparent display opposite to the user by using a first information capturing device; pre-identifying at least one object in the external object information, and tracing the object according to the identification result; capturing the information of the user by using the second information capturing device to detect the pointing range of the user with respect to the transparent display, and determining whether the traced object appears within the pointing range; and preload displaying the object information of the object that appears in the pointing range on the transparent display.

An embodiment of the disclosure provides an apparatus for preload display of object information, including a transparent display, a first information capturing device, a second information capturing device, and a processor. The first information capturing device is configured to capture an external object information on a side of the transparent display opposite to the user viewing the transparent display. The second information capturing device is configured to capture information of the user. The processor is coupled to the transparent display, the first information capturing device and the second information capturing device for loading and executing a plurality of program commands to: pre-identify at least one object in the external object information, and tracing the object according to the identification result; detect a pointing range of the user with respect to the transparent display by using the captured user information, and determine whether the traced object appears within the pointing range; and preload display the object information of the object that appears within the pointing range on transparent display.

Several exemplary embodiments accompanied with figures are described in detail below to further describe the disclosure in details.

BRIEF DESCRIPTION OF THE DRAWINGS

FIG. 1A and FIG. 1B are schematic views illustrating display of object information.

FIG. 2 is a block diagram illustrating an apparatus for preload display of object information according to an embodiment of the disclosure.

DESCRIPTION OF EMBODIMENTS

Figure 3:
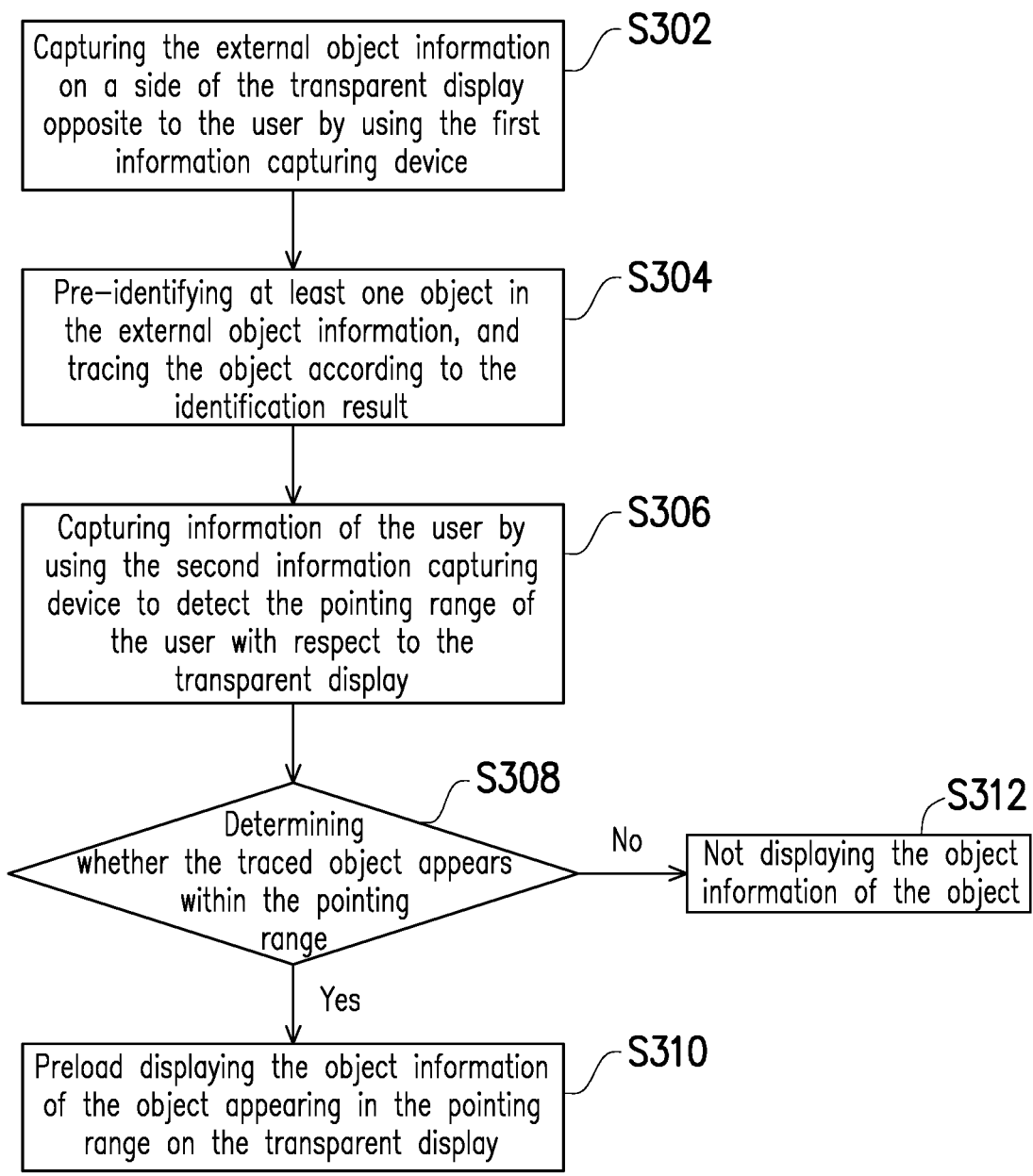
FIG. 3 is a flow chart illustrating a method for preload display of object information according to an embodiment of the disclosure.

An embodiment of the disclosure pre-identifies an object appearing in a display range of a transparent display, and temporarily stores the identified object information in a storage device; when a user has a pointing behavior with respect to the object, the object information is obtained directly from the storage device and fed back to the transparent display for display, thereby shortening the reaction time and improving the display efficiency.

FIG. 2 is a block diagram illustrating an apparatus for preload display of object information according to an embodiment of the disclosure. Referring to FIG. 2, a preload display apparatus 20 of the object information of the embodiment is, for example, an electronic apparatus having a transparent display function, and includes a second information capturing device 21, a first information capturing device 22, a transparent display 23, a storage device 24 and a processor 25, wherein the second information capturing device 21 (or the internal pointing device) is used for capturing a pointing direction of user, and the pointing direction may also be obtained through pointing behaviors such as a sight direction detected by an image sensor, a pointing direction of a remote controller, a touch and eyeball projection direction, the disclosure is not limited to capturing the pointing behavior of the user by the camera. The first information capturing device 22 (or external object identifying device, or external object positioning device) is used for identifying and positioning the external objects, and may also be used for positioning network communication facility of objects, such as identification and positioning of Bluetooth launchers and receivers, and the disclosure is not limited to the identification of the image of object captured by the camera.

In one embodiment, the second information capturing device 21 and the first information capturing device 22 respectively include a lens and an image sensor, wherein the lens may be composed of a combination of a plurality of concave-convex lenses, and the relative positions of the lenses are changed by being driven through an actuator such as a step motor or a voice coil motor, thereby changing the focal length of the lens so that the captured object can be imaged on the image sensor. The image sensor is provided with a charge coupled device (CCD), a complementary metal-oxide semiconductor (CMOS) element or other kinds of photosensitive elements, capable of sensing the light intensity entering the lens, thereby capturing the image signal to generate and output the image. In this embodiment, the second information capturing device 21 is configured to capture an internal image including the user viewing the transparent display 23, and the first information capturing device 22 is configured to capture an external object information on a side of the transparent display 23 opposite to the user. In another embodiment, the second information capturing device 21 and the first information capturing device 22 may also include a programmable processing unit, a micro-processor, and an application specific integrated circuits (ASIC), a programmable logic device (PLD) or the like for performing the function of identifying the object, but not limited thereto.

The transparent display 23 refers to that the display may have a certain degree of light transmittance, and the background on a side of the display opposite to the user can be shown when viewed by the user, for example, transmission transparent displays such as a thin film transistor liquid crystal display (TFT-LCD), a field sequential color display, an active matrix organic light emitting display (AMOLED), an electrowetting display, etc., or a projection transparent display. The transparent display 23 not only has a transparent display panel that can be seen through while displaying information, but also can be integrated with a touch panel that can detect the user's touch operation, allowing the user to interact with the display information.

The storage device 24 can be any type of fixed or movable random access memory (RAM), a read-only memory (ROM), a flash memory or similar elements or a combination of the above. In the embodiment, the storage device 24 is configured to store the image data captured by the second information capturing device 21 and the first information capturing device 22, and store the identification data obtained by the processor 25 from identifying the object in the image, and record computer programs or commands that are accessible and executable by the processor 25.

The processor 25 is, for example, a central processing unit (CPU), or other programmable general-purpose or specific-purpose microprocessor, a digital signal processor (DSP), a programmable controller, an application specific integrated circuit (ASIC), a programmable logic device (PLD), or the like, or a combination of these devices. The processor 25 is coupled to the second information capturing device 21, the first information capturing device 22, the transparent display 23, and the storage device 24, and can, for example, load program commands from the storage device 24, and execute a method for preload display of object information in an embodiment of the disclosure. In other embodiments, the preload display apparatus 20 of the object information may further include a communication module for communicating with the external device, an eye tracing device for tracing the eyeball of the user viewing the transparent display 23, and the like, the disclosure is not limited thereto. Detailed description of steps of a method for display of multiple object information according to an embodiment of the disclosure is provided below.

FIG. 3 is a flow chart illustrating a method for preload display of object information according to an embodiment of the disclosure. Referring to FIG. 2 and FIG. 3, the method of the embodiment may be applied to the preload display apparatus 20 of FIG. 2, and various elements of the preload display apparatus 20 are incorporated in the following descriptions to describe detailed steps of the method for preload display of object information in an embodiment of the disclosure.

First, the processor 25 captures the external object information on a side of the transparent display 23 opposite to the user by using the first information capturing device 22 (step S302), and the external object information may be matched with the display range of the transparent display 23, and capable of obtaining the position and related information of the object by identifying the object in the external object information, thereby displaying the object information on the transparent display 23 at a position corresponding to the object position in the image.

Next, at least one object in the external object information is pre-identified by the processor 25, and the object is traced according to the identification result (step S304). The processor 25, for example, identifies feature points, feature blocks, templates, colors, textures, shapes, movement states, and the like in the image through Haar-like feature related to classification region difference and algorithms such as local binary pattern (LBP) related to texture classification, thereby identifying object with features.

In addition, after the object is identified, the processor 25 performs on-the-spot tracing of various object to obtain information such as pixel coordinates, moving distance, feature point change, and area change of various object in real time, and utilizes function conversion of the identified distance and/or angle of object to obtain the position of the object in real space, and to obtain information such as speed, acceleration, and motion vector. The processor 25, for example, utilizes algorithms such as optical flow algorithm, a discriminative correlation filter (DCF), or DeepSRDCF combined with a convolution feature, and utilizes the characteristic that continuous trajectory is left by movement of object to look for neighboring pixels of the pixel in the previous frame showing the object in the next frame of the image to trace part of features, color, area, continuous vector, velocity gradient, etc., in order to achieve object tracing. This embodiment provides no limitation to the method of identifying and tracing the object.

In an embodiment, the processor 25 records the identification result and the object information of the object obtained according to the identification result in a database of the storage device 24, when it is subsequently detected that the user is looking at the object and the object information needs to be displayed, the object information of the object can be quickly loaded and displayed by accessing the storage device 24.

In the process of tracing the object, the second information capturing device 21 is used to capture the user information to detect the pointing range of the user with respect to the transparent display 23 (step S306), and determine whether the traced object appears in the pointing range (step S308).

In an embodiment, the above-mentioned pointing range is, for example, a sight range of the user viewing the transparent display 23. The processor 25, for example, determines the sight range of the user viewing the transparent display 23 according to the internal image including the user captured by the second information capturing device 21. In an embodiment, the processor 25, for example, estimates the distance between the user and the transparent display 23 according to the area occupied by the user in the internal image, and estimates the sight direction of the user according to the position and size of the user's face, eyes, and the like in the internal image, thereby determining the sight range of the user viewing the transparent display 23. In other embodiments, the processor 25 may also determine the sight range of the user viewing the transparent display 23 by using an additional eye tracing device to detect the angle of the user's eyeball. This embodiment provides no limitation to the method of determining the sight range.

In an embodiment, the above-mentioned pointing range is, for example, a range pointed by a pointing vector formed by a sight range and a touch range of the user on the transparent display 23. The processor 25, for example, combines the position of the user's eyeball detected by the second information capturing device 21 or the eyeball tracing device with the touch position of the user detected by the touch panel to generate a pointing vector, and presumes that there might be a difference between the touch position and the sight of object viewed by the eye, thus setting the range within an error around the position pointed by the pointing vector as the pointing range.

In step S308, if it is determined that the traced object appears within the pointing range, the processor 25 preload displays the object information of the object appearing in the pointing range on the transparent display 23 (step S310). On the contrary, the processor 25 does not display the object information (step S312). In detail, the processor 25, for example, detects the relative position of the user and the transparent display 23, and estimates an information display area suitable for the user to view the object information of various moving objects according to the relative position and the moving speed of various objects being traced, thereby preload displaying the object information of the object appearing in the pointing range in the estimated information display area on the transparent display 23.

In an embodiment, if the user does not move relative to the transparent display 23, the processor 25 may estimate the required time starting from detecting the pointing operation (for example, looking at the transparent display 23 or touching the transparent display 23 with the finger) performed by the user on the transparent display 23, then detecting the pointing range, determining the object appearing in the pointing range, obtaining the object information of the object, until the object information is displayed on the transparent display 23, then multiplying the time by the moving speed of the object, thereby obtaining the moving distance of the object on the transparent display 23 during the time, thus estimating an optimized information display area suitable for displaying the object information around the object after the movement, and displaying the object information of the object in the optimized information display area.

In an embodiment, if the user moves relative to the transparent display 23, the processor 25 not only needs to take into consideration the change of the optimized information display area caused by the movement of the object, but also needs to take into consideration the influence caused by the movement of the user to the optimized information display area. The processor 25 detects, for example, a change in the relative position of the user and the transparent display 23 to estimate the moving speed of the user. Then, similar to the method of processing the moving speed of the object, the processor 25 may multiply the time required for obtaining and displaying the object information of the object by the moving speed of the user to obtain the moving distance of the object relative to the user on the transparent display 23 during the time, thereby estimating an optimized information display area suitable for displaying the object information around the object after the movement, and displaying the object information of the object in the optimized information display area.

In an embodiment, the tracing of the object, for example, continues until the object is out of the display range of the transparent display 23, or the tracing stops when the speed of the object is slowed down to a preset speed. On the other hand, the preload display apparatus in an embodiment of the disclosure may continuously determine whether a new object appears when tracing the current object, and perform identification and tracing of the object when it is determined that a new object enters the edge of the display range of the transparent display 23 or appears in the display range, and record the identification result and related object information for use in subsequent preload display.

In an embodiment, the processor 25 may, for example, perform parallel processing on pre-identification and tracing of the object, determination of the pointing range, and preload displaying of the object information by using a plurality of threads, thereby improving system performance. For example, the processor 25 may apply a first thread to identify multiple objects and users; apply a second thread to trace multiple objects and user's sight, and perform mapping and/or matching the objects with the user's sight; and use a third thread to perform preload and display of the storage device 24 on the multiple objects and user information. In this manner, the preload display apparatus 20 of the embodiment may support a situation in which a large amount of calculations, such as calculating multiple objects and multiple users.

Through the pre-identification and tracing of the objects combined with the preload display of the object information, the screen display gap caused by the identification may be reduced. The screen display gap refers to estimating the moving distance of each of the objects within the identification time according to the moving speed of each of the objects and the identification time required for identifying each of the objects, thereby improving the display efficiency. In addition, in an embodiment, the objects appearing in the transparent display 23 are pre-identified, and even if the objects overlap each other after the movement, the preload display apparatus 20 may be able to display the object information separately without being affected by the overlapping.

An embodiment of the disclosure takes into consideration that the pre-identification and tracing of the object requires computational cost. For the pre-identification step, an additional dynamic determining relationship may be established to determine whether to pre-identify and trace the object by determining the degree of influence of the screen display gap caused by the system processing time to the object information display range, which ensures that the cost of computing resources is reduced without overly affecting the experience of use.

Figure 4:
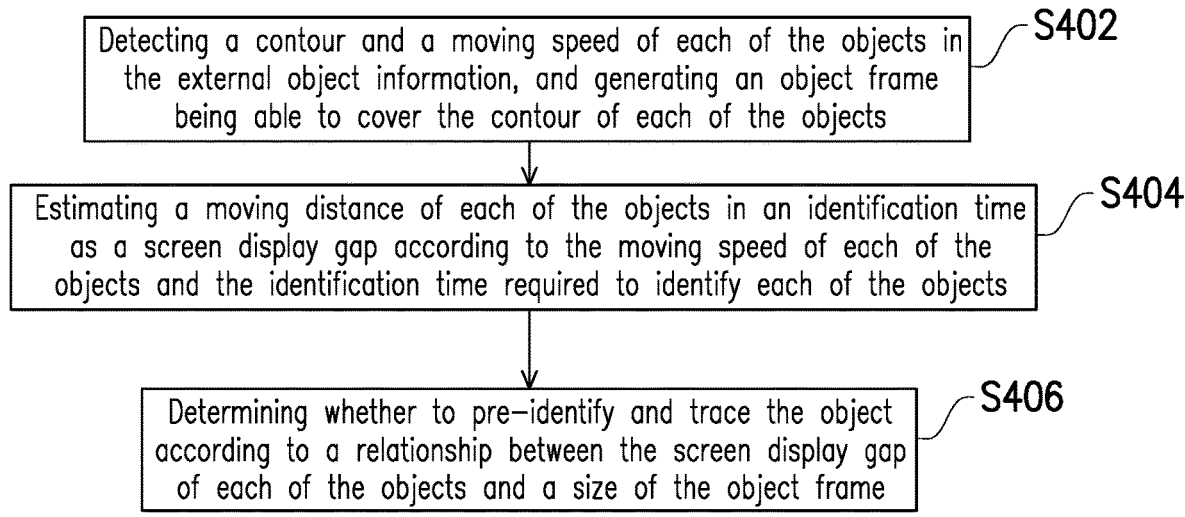
FIG. 4 is a flow chart of a method for dynamically determining a preload display according to an embodiment of the disclosure.

FIG. 4 is a flow chart of a method for dynamically determining a preload display according to an embodiment of the disclosure. Referring to FIG. 2, FIG. 3 and FIG. 4, the method of this embodiment may be applied before step S304 of FIG. 3 to determine whether to perform the pre-identification and tracing process after step S304. The following is a detailed description of the method of dynamically determining the preload display according to an embodiment of the disclosure with reference to various elements of the preload display apparatus 20 of the object information.

First, the processor 25 detects the contour and the moving speed of each of the objects in the external object information captured by the first information capturing device 22, and generates an object frame that can cover the contour of each of the objects (step S402). In an embodiment, the processor 25 may, for example, perform a contour identification algorithm to detect the contours of each of the objects appearing in the image, and to find a smallest rectangle that can cover the contour of the object as the object frame of the object. In other embodiments, the object frame may also be defined by regions of other shapes or sizes, the disclosure is not limited thereto. In addition, the processor 25 may, for example, use the first information capturing device 22 to capture multiple external object information, calculate the moving speed according to the moving distance of the object in the images, or use other sensors to sense the moving speed of the object, the disclosure provides no limitation in this regard.

Then, the processor 25 may estimate the moving distance of each of the objects within the identification time as a screen display gap according to the moving speed of each of the objects and the identification time required to identify each of the objects (step S404). The processor 25 calculates, for example, the moving speed of the object in the image (i.e., the moving speed in the photosensitive element of the first information capturing device 22), and multiply the moving speed by the identification time of the object to obtain the moving distance of the object during identification. The processor 25 then multiplies the moving distance by the ratio of the screen size of the transparent display 23 to the size of the photosensitive element of the first information capturing device 22 to obtain a screen display gap caused by performing the identification.

Finally, the processor 25 determines whether to pre-identify and trace the object based on the relationship between the screen display gap of each of the objects appearing within the user's sight range and the size of the object frame (step S406). In an embodiment, when the estimated screen display gap of the object is greater than a multiple of the width of the object frame of the object in the moving direction of the object, the processor 25 determines to pre-identify and trace the object. On the contrary, the processor 25 does not pre-identify and trace the object. The above multiple is, for example, an arbitrary number greater than one.

Figure 5A:
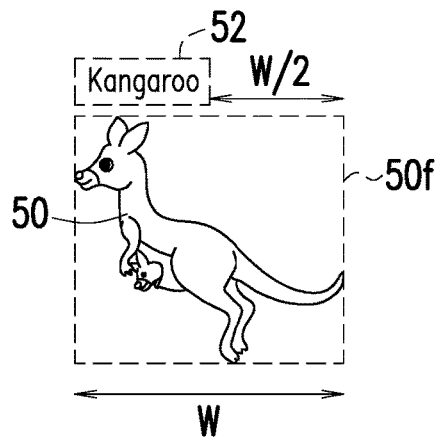
FIG. 5A to FIG. 5C are examples showing a method for dynamically determining a preload display according to an embodiment of the disclosure.
Figure 5B:
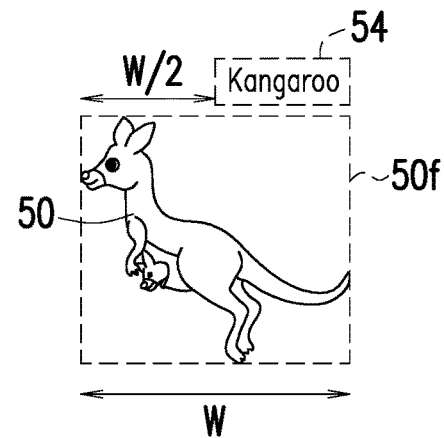
Figure 5C:
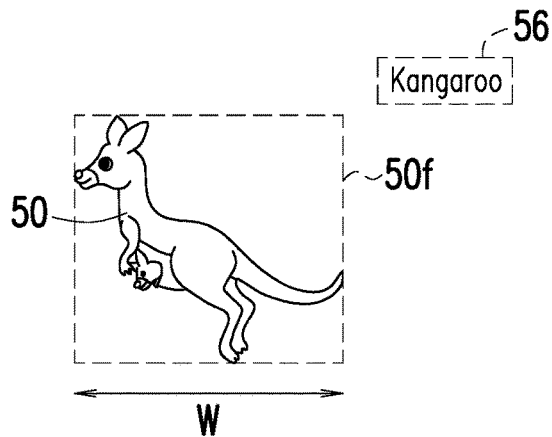

For example, FIG. 5A to FIG. 5C are examples showing a method for dynamically determining a preload display according to an embodiment of the disclosure. This embodiment assumes that an object 50 appearing on the transparent display is moved to the left at a speed of 60 kilometers per hour, and a width W of the object frame 50f is 50 cm, and identifying the object 50 takes about 265 milliseconds. In the embodiment, it is exemplified that a threshold value for determining whether or not to pre-identify and trace the object 50 is one time the width (i.e., W) of the object frame 50f of the object 50 in the moving direction of the object 50. That is, the object 50 is pre-identified and traced when the calculated screen display gap is greater than the threshold value.

According to the moving speed of the object 50, if the estimated screen display gap is between 0 and W/2 (e.g., the position (which is based on the center point) of the object information display frame 52 in FIG. 5A), it can be determined that the displayed object information falls within a preferred display range, so there is no need to pre-identify the object 50; if the estimated screen display gap is between W/2 and W (e.g., the position of the object information display frame 54 in FIG. 5B), it can be determined that the displayed object information falls within a normal but acceptable display range, so there is no need to pre-identify the object 50; if the estimated screen display gap exceeds W (e.g., the position of the object information display frame 52 in FIG. 5C), it can be determined that the displayed object information falls within a bad display range, so the object 50 needs to be pre-identified to solve the problem of overly large display gap caused by the processing time.

On the other hand, the dynamic determination relationship for determining whether or not to pre-identify and trace the object may be defined according to the relationship between the moving speed of the object and the vision resolution of the human eye. In detail, the preload display apparatus 20 in an embodiment of the disclosure may detect, for example, a motion angular velocity $r_{ob}$ of the object relative to the user, and determine whether to pre-identify and trace the object according to whether the product of the identification time T required to identify various objects and the motion angular velocity $r_{ob}$ is greater than or equal to the user's vision resolution $\theta_{eye}$. When it is determined that the product of the identification time T and the motion angular velocity $r_{ob}$ is greater than or equal to the user's vision resolution $\theta_{eye}$ (i.e., $Txr_{ob} \geq \theta_{eye}$), it may be determined to pre-identify and trace the object 50; otherwise, the object 50 is not pre-identified and traced.

An embodiment of the disclosure performs a judgment similar to the dynamic determining relationship of the above embodiment before preparing to preload display the object information of the object when determining that the object appears within the user's pointing range. The preload display apparatus 20 in an embodiment of the disclosure additionally estimates the screen display gap of the object after estimating the optimized information display area of the object, and determines the relationship between the estimated screen display gap and the object frame size of the object to determine whether to display the object information of the object in the optimized information display area. For example, when the screen display gap is less than one time the width of the object frame in the moving direction of the object, it may be determined to display the object information of the object in the optimized information display area. The screen display gap is, for example, a gap between the optimized information display area and the object frame of the object after the movement, and but not limited thereto.

In an embodiment of the disclosure, in the process of identifying the object, the moving speed of each of the objects is determined according to the identification result, and it is determined whether to trace the object accordingly. In detail, in the case where the object moves at a slower speed (for example, not exceeding the preset speed), it can be predicted that even if it takes time to identify the object, since the difference in screen display gap caused by the identification is not large, it may be determined not to trace the object to save computing resources. In the case where the object moves faster (for example, exceeding the preset speed), since the screen display gap caused by the identification causes the displayed object information to fall within a bad display range, it may be determined to trace the object to avoid situations where the display gap is too large.

An embodiment of the disclosure may also obtain display information, pixel coordinates, background grayscale or background color degree of the object or a combination of the above information when identifying the object, and record the above information in the database of the storage device 24. When the object information needs to be displayed subsequently, the above information may serve as reference to determine a preferred method (font size, color, brightness, etc.) to display the object information.

Figure 6:
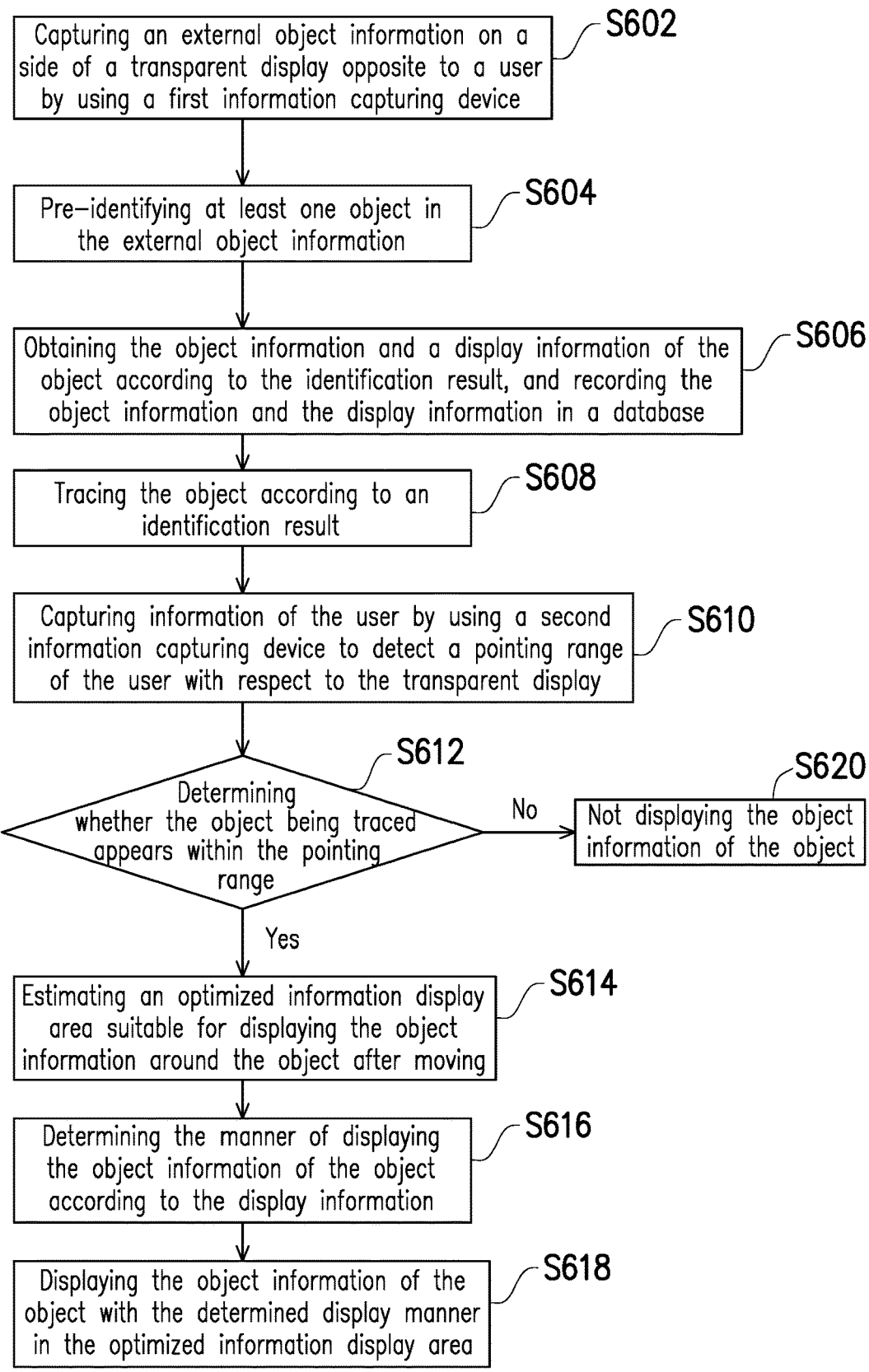
FIG. 6 is a flow chart illustrating a method for preload display of object information according to an embodiment of the disclosure.

FIG. 6 is a flow chart illustrating a method for preload display of object information according to an embodiment of the disclosure. Referring to FIG. 2 and FIG. 6, the method of the embodiment may be applied to the preload display apparatus 20 of the object information in FIG. 2. The following is a detailed description of the method for preload display of object information according to an embodiment of the disclosure with reference to various elements of the preload display apparatus 20 of the object information.

First, the processor 25 captures the external object information on a side of the transparent display 23 opposite to the user by using the first information capturing device 22 (step S602), and pre-identifies at least one object in the external object information (step S604). The above steps S602 to S604 are the same as or similar to the steps S302 to S304 of the foregoing embodiment, and thus related details are not repeated herein.

In the embodiment, in the process of identifying the object, the processor 25 not only can obtain the object information of the object according to the identification result, but also can obtain display information such as the pixel coordinates, the background grayscale or the background color degree of the object from the identification result, thus storing the object information and the display information in the database (step S606).

Then, the processor 25 traces the object according to the identification result (step S608), and the second information capturing device 21 captures the user information to detect the pointing range of the user with respect to the transparent display 23 (step S610), and determines whether or not the traced object appears within the pointing range (step S612). The above steps S608 to S612 are the same as or similar to the steps S304 to S308 of the foregoing embodiment, and thus related details are not repeated herein.

If it is determined that the traced object appears within the pointing range, the processor 25 preload displays the object information of the object appearing in the pointing range on the transparent display 23. For example, the processor 25 first estimates an optimized information display area suitable for displaying the object information around the object after moving by the moving distance (step S614), and determines the manner of displaying the object information of the object according to the previously recorded display information such as the pixel coordinates, the background grayscale and the background color degree of object (step S616), and finally displays the object information of the object with the determined display manner in the optimized information display area (step S618). On the other hand, if it is determined that the traced object does not appear in the pointing range, the processor 25 does not display the object information (step S620).

By using the above method, not only the object information may be displayed in the optimized information display area, but also the object information may be displayed in a preferable display manner, thereby realizing optical display of the object information.

An embodiment of the disclosure determines the tracing frequency of tracing the object by the user's concentration on the object. When the preload display apparatus 20 detects that the user's sight is stably following an object and its surroundings, the preload display apparatus 20 may speed up the frame per second (FPS) to obtain sufficient dynamic position and information of the object, otherwise the frame per second is reduced to decrease the burden on system resource.

In detail, it takes about 100-350 milliseconds for the human eye to focus and gaze to get enough picture information. If it is only for scanning and not focusing, the minimum flicker frequency that the human eye does not obviously sense the discontinuous of the picture is 16 fps due to the visual persistence. If the flicker frequency is at a higher level ranging from 50 Hz to 90 Hz, such flicker frequency is stable to the user. In this embodiment, the camera takes images in order to provide coordinates, and is not intended to display the images directly to the user. The frame per second may be increased to provide more instant information to the human eye when necessary.

Figure 7:
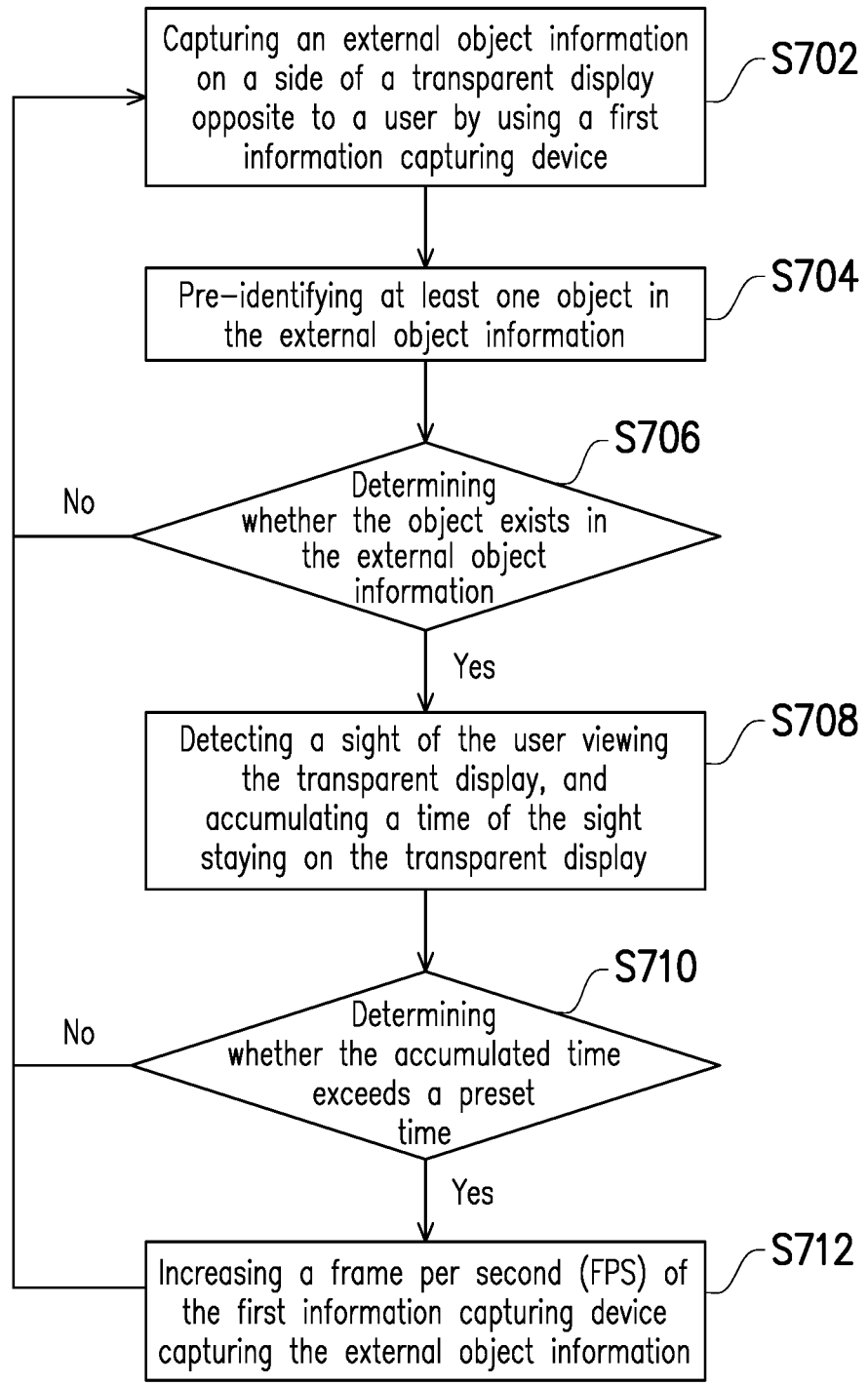
FIG. 7 is a flow chart illustrating a method for preload display of object information according to an embodiment of the disclosure.

FIG. 7 is a flow chart illustrating a method for preload display of object information according to an embodiment of the disclosure. Referring to FIG. 2 and FIG. 7, the method of the embodiment may be applied to the preload display apparatus 20 of the object information in FIG. 2. The following is a detailed description of the method for preload display of object information according to an embodiment of the disclosure with reference to various elements of the preload display apparatus 20 of the object information.

First, the processor 25 captures the external object information on a side of the transparent display 23 opposite to the user by using the first information capturing device 22 (step S702), and pre-identifies at least one object in the external object information (step S704). The above steps S702 to S704 are the same as or similar to the steps S302 to S304 of the foregoing embodiment, and thus related details are not repeated herein.

In the embodiment, when identifying the object, the processor 25 may determine whether or not the object exists in the external object information (step S706). If it is determined that the object exists, the processor 25 may detect the sight of the user viewing the transparent display 23, accumulate the time when the sight stays on the transparent display 23 (step S708), and determine whether the accumulated time exceeds the preset time (step S710).

When it is determined that the accumulated time exceeds the preset time, the processor 25 may increase the frame per second of the first information capturing device 22 capturing the external object information (step S712), and return to step S702 to control the first information capturing device 22 to capture the external object information with the increased frame per second. The processor 25 increases the frame per second of the external object information captured by the first information capturing device 22 from 16 fps to 30 fps, for example, but not limited thereto.

On the other hand, if the processor 25 determines in step S706 that there is no object in the external object information, or if the processor 25 determines in step S710 that the accumulated time does not exceed the preset time, then the process flow returns to step S702. The processor 25 controls the first information capturing device 22 to capture the external object information with the original frame per second.

In an embodiment, after the processor 25 increases the frame per second of the first information capturing device 22 capturing the external object information, the processor may, for example, continuously determine whether the object moves away (that is, the object does not exist in the external object information) and/or whether the user's sight moves away (i.e., the accumulated sight staying time does not exceed the preset time), and accumulate the number of times or time of occurrence of the above situation, so that when the accumulated number of times or time exceeds the preset threshold value, the increased frame per second is adjusted back to the original frame per second as appropriate to reduce the burden of computing resources.

Other Embodiments

In an embodiment, after identifying the object in the image, the preload display apparatus 20 may determine that the position range of the object that can be seen by the user located in front of the transparent display 23 according to, for example, the relative position between various objects and the transparent display 23, such that when it is determined that there is a user entering the position range, the object is traced to support the preload display. The preload display apparatus 20 may determine the position range on a side of the transparent display 23 relative to the user that can be seen by the user according to the relative position between the user and the transparent display 23 when it is determined that there is a user viewing the transparent display 23 (e.g., appearing in the image captured by the second information capturing device 21), such that when it is determined that there is an object entering the position range, the object is traced to support the preload display.

In an embodiment, the preload display apparatus 20 may be configured with two or more second information capturing devices 21 (e.g., cameras disposed on both sides of the transparent display) to trace the user's pointing range, and may be configured with two or more first information capturing device 22 to obtain an image larger than the user's field of view, and three-dimensional spatial coordinates and rotation angles of the object may be established based on the image of at least two angles to facilitate subsequent tracing of the object and preload display of the object information thereof. For example, according to the known viewing angle of camera and the original feature point size of the object, by capturing the sizes of two sets of feature points of an object in the image at different positions, the rotation angle is calculated according to the size proportion at different positions, and the shrinking of forward size caused by distance is back-calculated to calculate the distance of object.

In an embodiment, the preload display apparatus 20, for example, identifies the size of the object moving faster, and when the object size is larger than the preset size, by tracing the moving path thereof, the preload display apparatus 20 preload displays the object information at a fixed position of the moving path, thereby avoiding the discomfort of the user's eyes due to the rapid movement of the display information along with the object.

In the method and apparatus for preload display of object information according to an embodiment of the disclosure, by pre-identifying and tracing an object on a side of the transparent display opposite to the user, and temporarily storing the identification information in the storage device, when there is a user triggering a pointing behavior on the object, the preload display apparatus may preload and display the object information from the storage device, thereby reducing the display gap caused by the identification of the object. In this manner, the reaction time of the transparent display may be shortened and the display efficiency may be improved.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A method for preload display of object information, comprising the following steps:
    capturing an external object information on a side of a transparent display opposite to a user by using a first information capturing device;
    detecting a contour and a moving speed of each of at least one object in the external object information, and generating an object frame covering the contour of each of the at least one object;
    estimating a moving distance of each of the at least one object in an identification time required to identify the object as a screen display gap according to the moving speed of the object and the identification time;
    pre-identifying each of the at least one object in the external object information, and tracing the object according to an identification result in response to the screen display gap of the object being greater than a multiple of a width of the object frame of the object in a moving direction of the object, wherein the multiple is an arbitrary number greater than one;
    capturing information of the user by using a second information capturing device to detect a pointing range of the user with respect to the transparent display, and determining whether the object being traced appears within the pointing range; and
    preload displaying an object information of the object appearing within the pointing range on the transparent display.

2. The method of claim 1, wherein the pointing range is obtained through at least one of pointing behaviors comprising a sight direction detected by an image sensor, a pointing direction of a remote controller, and a touch and eyeball projection direction.

3. The method of claim 1, wherein the step of preload displaying the object information of the object appearing in the pointing range on the transparent display comprises:
- detecting a relative position of the user and the transparent display;
- estimating, according to the relative position and a moving speed of each of the objects being traced, an information display area suitable for the user to view the object information of each of the objects that are moving; and
- preload displaying the object information of the object appearing in the pointing range in the estimated information display area.

4. The method of claim 3, wherein the step of preload displaying the object information of the object appearing in the pointing range in the estimated information display area comprises:
- detecting a contour and a moving speed of each of the objects in the external object information, and generating an object frame covering the contour of each of the objects;
- estimating a moving distance of each of the objects in an identification time required to identify each of the objects as a screen display gap according to the moving speed of each of the objects and the identification time; and
- determining whether to display the object information of the object according to a relationship between the screen display gap of each of the objects appearing in the pointing range and a size of the object frame.

5. The method of claim 1, wherein before the step of pre-identifying the object in the external object information and tracing the object according to the identification result, the method further comprises:
- detecting a motion angular velocity of the object relative to the user; and
- determining whether to pre-identify and trace the object according to whether a product of the identification time required to identify each of the objects and the motion angular velocity is greater than or equal to a vision resolution of the user.

6. The method of claim 1, wherein after the step of pre-identifying the object in the external object information, the method further comprises:
- obtaining the object information and a display information of the object according to the identification result, and recording the object information and the display information in a database, wherein
- the step of preload displaying the object information of the object appearing in the pointing range on the transparent display comprises:
- reading the display information and the object information recorded in the database, determining a manner for displaying the object information according to the read display information, and accordingly displaying the read object information.

7. The method of claim 1, wherein the step of tracing the object according to the identification result comprises:
- determining, according to the identification result, whether a moving speed of each of the objects exceeds a preset speed;
- tracing the object if the moving speed of the object exceeds the preset speed; and
- not tracing the object if the moving speed of the object does not exceed the preset speed.

8. The method of claim 1, wherein the step of pre-identifying at least one object in the external object information and tracing the object according to the identification result further comprises:
- determining whether the object exists in the external object information;
- if the object exists, detecting a sight of the user viewing the transparent display, accumulating a time of the sight staying on the transparent display, and determining whether the time exceeds a preset time; and
- when the time exceeds the preset time, increasing a frame per second (FPS) of the first information capturing device capturing the external object information.

9. An apparatus for preload display of object information, comprising:
- a transparent display;
- a first information capturing device, capturing an external object information on a side of the transparent display opposite to a user viewing the transparent display;
- a second information capturing device, capturing information of the user; and
- a processor, coupled to the transparent display, the first information capturing device, and the second information capturing device, and loading and executing a plurality of program commands to:
- detecting a contour and a moving speed of each of at least one object in the external object information, and generating an object frame covering the contour of each of the at least one object;
- estimating a moving distance of each of the at least one object in an identification time required to identify the object as a screen display gap according to the moving speed of the object and the identification time;
- pre-identify each of the at least one object in the external object information, and trace the object according to an identification result in response to the screen display gap of the object being greater than a multiple of a width of the object frame of the object in a moving direction of the object, wherein the multiple is an arbitrary number greater than one;
- detect a pointing range of the user with respect to the transparent display by using the user information, and determine whether the traced object appears within the pointing range; and
- preload display an object information of the object appearing within the pointing range on the transparent display.

10. The preload display apparatus of claim 9, further comprising a touch panel for detecting the user's touch on the transparent display, wherein the pointing range comprises a sight range of the user viewing the transparent display, or a range pointed by a pointing vector formed by the sight range and a touch range of the user on the transparent display.

11. The preload display apparatus of claim 9, wherein the processor further detects a relative position of the user and the transparent display, and estimates an information display area suitable for the user to view the object information of each of the moving objects according to the relative position and a moving speed of each of the objects being traced, and preload displays the object information of the object appearing in the pointing range in the estimated information display area.

12. The preload display apparatus of claim 11, wherein the processor further comprises:

detecting a contour and a moving speed of each of the objects in the external object information, and generating an object frame covering the contour of each of the objects;

estimating a moving distance of each of the objects in an identification time required to identify each of the objects as a screen display gap according to the moving speed of each of the objects and the identification time; and determining whether to display the object information of the object according to a relationship between the screen display gap of each of the objects appearing in the pointing range and a size of the object frame.

13. The preload display apparatus of claim 9, wherein the processor further comprises:

detecting a motion angular velocity of the object relative to the user; and determining whether to pre-identify and trace the object according to whether a product of the identification time required to identify each of the objects and the motion angular velocity is greater than or equal to a vision resolution of the user.

14. The preload display apparatus of claim 9, wherein the processor further comprises:

obtaining the object information and a display information of the object according to the identification result, and recording the object information and the display information in a database, wherein the step of preload displaying the object information of the object appearing in the pointing range on the transparent display comprises:

reading the identification result and the object information recorded in the database, determining a manner for displaying the object information according to the read display information, and accordingly displaying the read object information.

15. The preload display apparatus of claim 9, wherein the processor comprises:

determining, according to the identification result, whether a moving speed of each of the objects exceeds a preset speed;

tracing the object if the moving speed of the object exceeds the preset speed; and not tracing the object if the moving speed of the object does not exceed the preset speed.

16. The preload display apparatus of claim 9, wherein the processor further comprises:

determining whether the object exists in the external object information;

if the object exists, detecting a sight of the user viewing the transparent display, accumulating a time of the sight staying on the transparent display, and determining whether the time exceeds a preset time; and when the time exceeds the preset time, increasing a frame per second (FPS) of the first information capturing device capturing the external object information.

\* \* \* \* \*